United States Patent [19]
Uden

[11] 3,735,870
[45] May 29, 1973

[54] ACTIVATED SLUDGE PLANT
[76] Inventor: Rupert H. Uden, Prosser, Nebr.
[22] Filed: Aug. 12, 1971
[21] Appl. No.: 171,060

[52] U.S. Cl. .................. 210/138, 210/195, 210/221, 210/258, 210/259, 210/527
[51] Int. Cl. ............................................. B01d 21/10
[58] Field of Search ........................ 210/6, 7, 13, 14, 210/16, 195, 197, 199, 201, 322, 525, 527, 532

[56] References Cited

UNITED STATES PATENTS

| 2,875,151 | 2/1959 | Davidson | 210/4 |
| 3,047,492 | 7/1962 | Gambrel | 210/7 |
| 3,151,063 | 9/1964 | Gunson | 210/7 |
| 3,694,353 | 9/1972 | Yang et al. | 210/7 |

Primary Examiner—Samih N. Zaharna
Assistant Examiner—Robert H. Spitzer
Attorney—Henderson & Strom

[57] ABSTRACT

A sewage treatment apparatus adapted to handle sewage loading, the apparatus designed for aerobic decomposition of fresh sewage and comprising in series: a digester tank, a plurality of aeration tanks, a settling tank, and a final aeration tank, wherein a raw sewage influent passes through an activated sludge process and is discharged as a purified water effluent.

11 Claims, 7 Drawing Figures

INVENTOR.
RUPERT H. UDEN
BY
ATTORNEYS

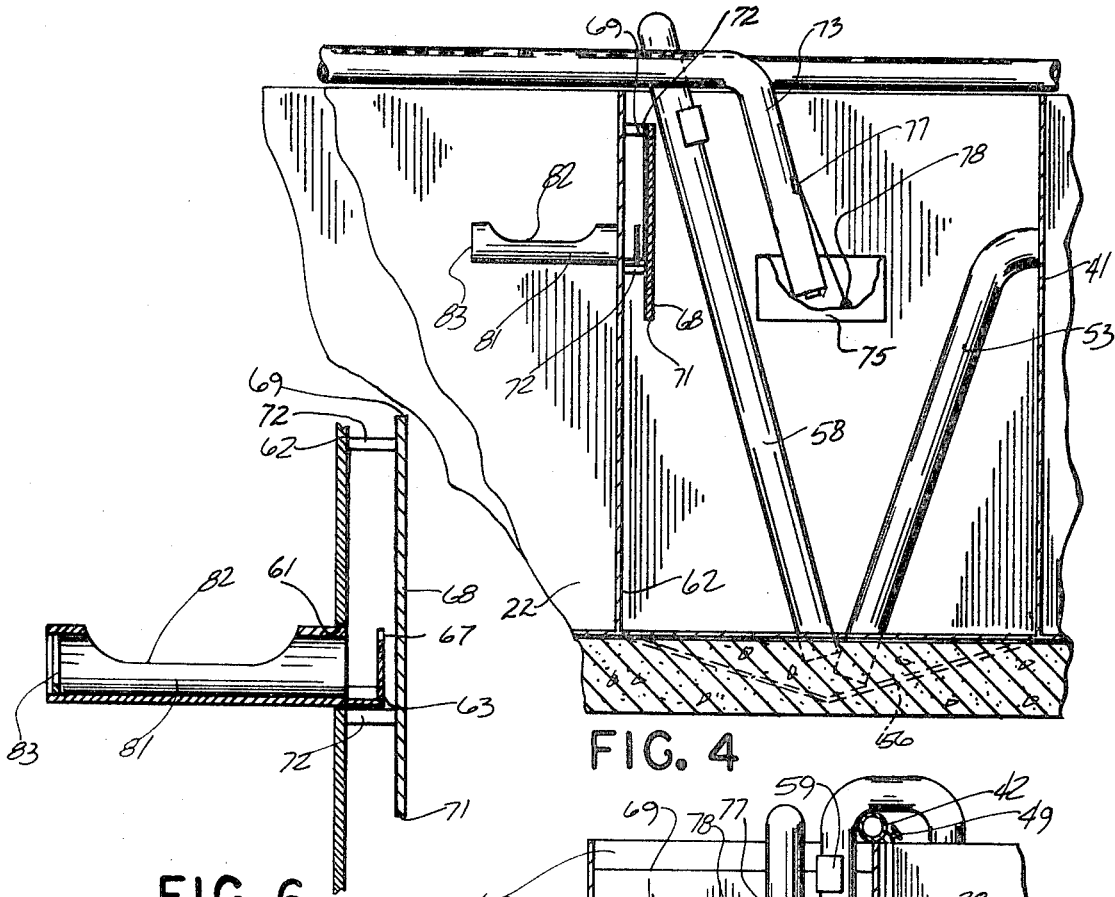
FIG. 4
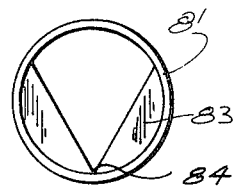
FIG. 6
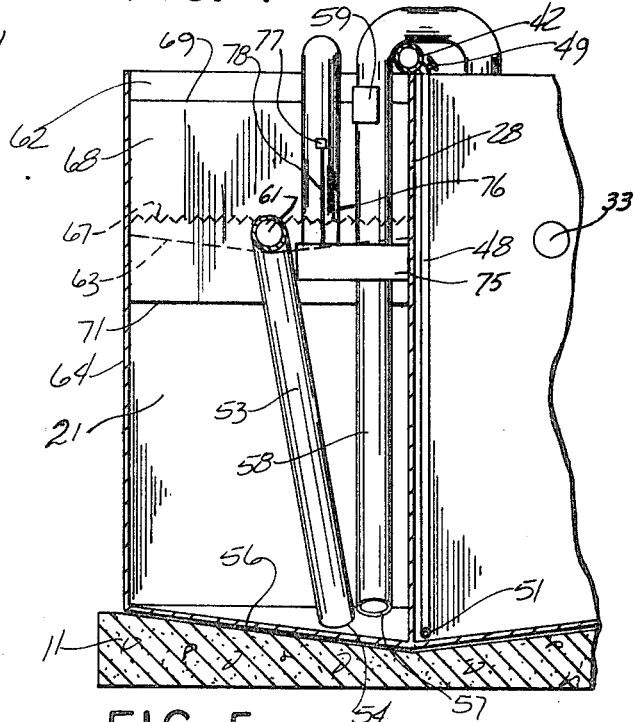
FIG. 7
FIG. 5
INVENTOR.
RUPERT H. UDEN
BY
Henderson & Strom
ATTORNEYS 3,735,870

ACTIVATED SLUDGE PLANT

BACKGROUND OF THE INVENTION

The migration of people and industry to areas beyond public sewers has resulted in the mass use of septic tanks. Lacking efficient equipment, little could be done to counteract the capacity of the soil to accept sewage wastes or the affect these wastes have on sub-surface ground water commonly used by home or community as clean drinking water. In the interest of public health, as well as to allow construction on lands unfit for septic tank use, a method for treating waste water in a manner far superior to septic tank discharge is necessary.

Furthermore a surge problem exists in the common septic tank and aerobic process plants. That is, a surge of influent into the tank will cause a surge in the effluent from the tank which in may instances prevents proper action within the tank and allows untreated or partially treated waste water to flow therefrom.

A septic tank effects decomposition by the action of anaerobic bacteria, wherein oxygen is not necessary. In this process, complex organic compounds are broken down into simpler ones and, while oxidation goes on to some extent, it is usual to consider aerobic conditions essential to oxidation which approaches completeness.

Fresh sewage, as it enters a septic tank, contains free oxygen, necessary for the aerobic bacteria, which are minute cells present in the sewage. The bacterial activity rapidly depletes oxygen and the sewage becomes stale and finally septic, wherein the anaerobic bacteria become active and begin a decomposition process, a process which is slower and less complete than the preferred aerobic process.

Various aerobic processes have been employed for the treatment of sewage in industrial and commercial installation, an activated sludge process being one of these. In principle, this is one in which sewage standing in or flowing through a tank is brought into intimate contact with biologically active sludge previously produced by the same process, air being supplied at the same time to maintain the activity of the sludge. The activated sludge system has been effective in the larger packaged or municipal sewage treatment systems, but in the single, rural homes, filling stations, schools, etc., the load fluctuations are much greater, thus requiring very close control and maintenance to insure good treatment. The need has thus been shown for an effective small aerobic sewage treatment system that will meet accepted criteria relative to load factors, retention times and air rates.

SUMMARY OF THE INVENTION

This invention applies the principle of the activated sludge plant to a small, integral, unit. Fluidly connected in series are a septic or digester tank, a plurality of aeration tanks, a settling tank and a final aeration tank. Fresh sewage enters the digester tank where all heavy grit and large particles remain to decompose and break down to be carried into the next stage, the aeration cycle. Here it meets re-aerated sludge entering from an advanced point in the cycle. The mixture of sewage and sludge then passes along a series of aerating tanks, the tanks being supplied by air from a common source, to a settling tank where the activated sludge is pumped from the bottom to the first aeration tank, the floating scum is pumped into the digester tank, and the purified sewage is passed to a final aeration tank and discharged into a river, onto the land, or the like. The aeration tanks are fitted with diffusers, each with its own control valve through which air is passed in a finely divided state. The air keeps the sewage agitated and assists coagulation of colloids as well as supplying oxygen for aerobic organisms necessary for the satisfactory working of the process. A baffle and trough combination is employed in the settling tank to facilitate the discharge of effluent liquid into the final aeration tank without admitting any appreciable amounts of scum or sludge.

It is therefore an object of this invention to provide an aerobic sewage disposal system for single and multiple home use, schools, commercial establishments, industrial plants and the like.

Another object of this invention is the provision in an aerobic sewage disposal system for the discharge of clean liquid effluent without accompanying solids.

Yet another object of this invention is the provision for an aerobic sewage disposal system which is extremely effective where load fluctuations are great.

Yet a further object of this invention is to provide an aerobic sewage disposal system which properly handles any surge load to which it is subjected.

Still another object of this invention is the provision in an aerobic sewage disposal system for the decomposition of solid particles present in fresh sewage.

A further object of this invention is the provision in an aerobic sewage disposal system for a series of aerating tanks, through which effluent progressively passes and is purified, resulting in a liquid having no suspended sludge therein nor scum floating thereon.

Another object of this invention is the provision in an aerobic sewage treatment system for the separation of purified liquid effluent, sludge, and scum.

Yet another object of this invention is the provision for a single home aerobic sewage treatment system which is extremely functional, simple in construction, and economical to manufacture.

These objects and other features and advantages of this invention will become more readily apparent upon reference to the following description when taken in conjunction with the appended drawings.

In the drawings, as hereinafter described, a preferred embodiment is depicted, however various other modifications and alternate constructions can be made thereto without departing from the true spirit and scope of the invention.

BRIEF DESCRIPTION OF THE DRAWINGS

FIG. 4 is a partial sectional view of the settling portion of the invention as seen along lines 4—4 in FIG. 1.

FIG. 5 is a partial sectional view thereof as seen along lines 5—5 in FIG. 1.

FIG. 6 is a partial sectional view of the baffle and weir portion of the invention as seen along lines 6—6 in FIG. 1.

FIG. 7 is an end elevational view of the weir.

DESCRIPTION OF THE PREFERRED EMBODIMENT

Figure 1:
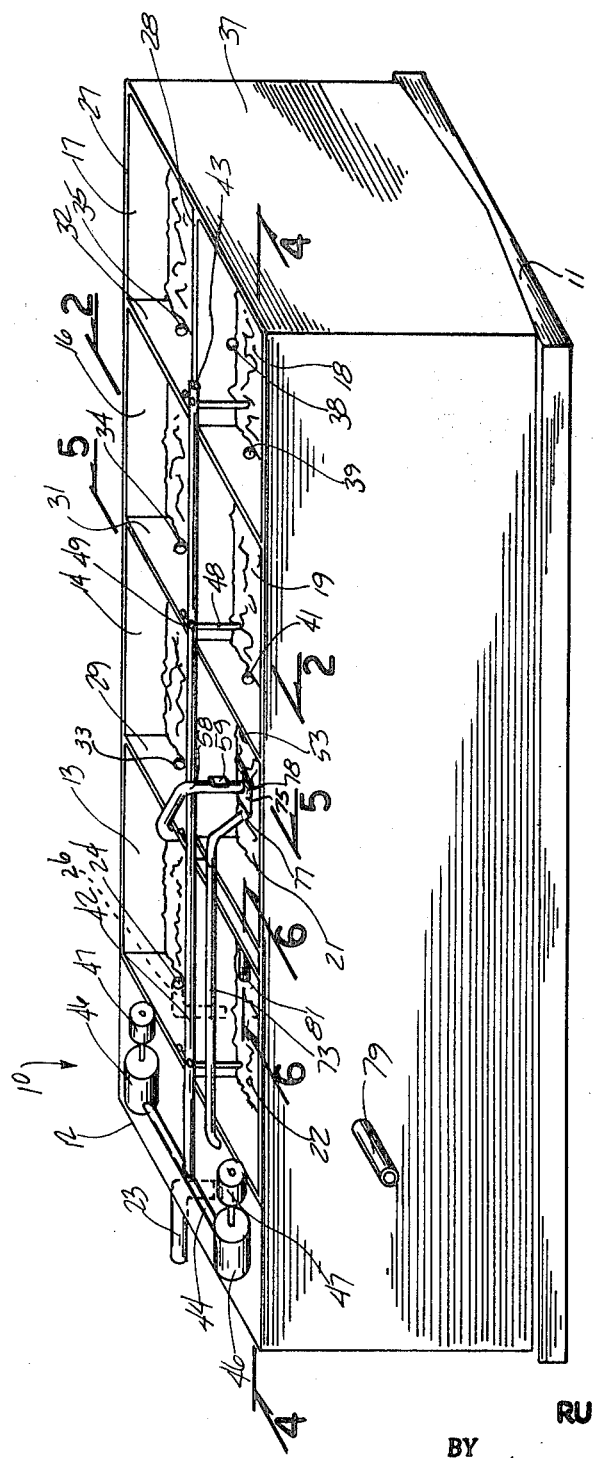
FIG. 1 is a perspective view of the preferred embodiment as seen in use.

Referring now to the drawings, the invention is indicated generally at 10 in FIG. 1. A concrete base support 11 has mounted thereon a digester tank 12; aerating tanks 13, 14, 16, 17, 18 and 19; settling tank 21; and a final aeration tank 22.

The digester tank 12 is rectangular in cross section and its width extends the full width of the base 11. Disposed in one end of the digester tank 12, near the top thereof, is an influent pipe 23 extending normally inwardly and downwardly a short distance, the function of which is to introduce fresh sewage into the system. Disposed in the opposite wall, near the top thereof is a hole 24 leading to the aeration tank 13. A pipe 26 fluidly connects the hole 24 to the lower portion of the digester tank 12, the lower end of pipe 26 being open and free to admit the liquid content in the septic tank 12 and to carry it into the aeration tank 13.

Figure 2:
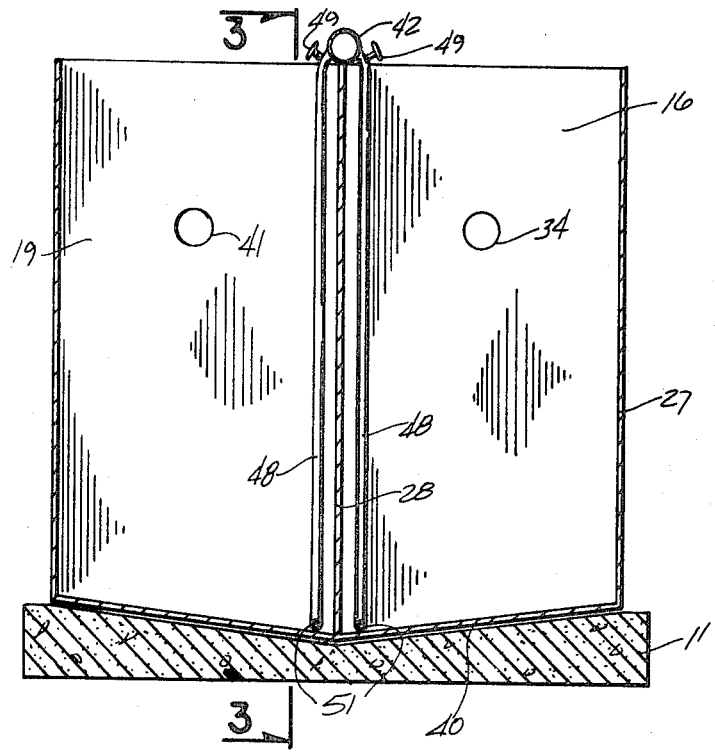
FIG. 2 is a sectional view thereof, as seen along lines 2—2 in FIG. 1.

The aeration tanks 13 thru 17 (FIGS. 1 and 2) are all substantially identical and are formed by the common parallel longitudinal walls, the outer longitudinal wall 27 and the central longitudinal wall 28, interconnected by transverse walls 29, 31 and 32, the transverse walls having holes 33, 34, and 35 extending therethrough, respectively. The end wall of tank 13 is the inside wall of the digester tank 12. Tank 17 has an end wall 37 extending symmetrically beyond the central longitudinal wall to form the end wall of tank 18, and a hole 38 is disposed in the central longitudinal wall between tanks 17 and 18 to fluidly connect the two. Tanks 18 and 19 are mirror images of tanks 17 and 16 respectively, and have holes 39 and 41 through their transverse walls, respectively. FIG. 2 indicates the sloping nature of the tanks' floor surface 40, that of sloping downwardly toward the central longitudinal wall 28 from the outer longitudinal wall 27.

Figure 3:
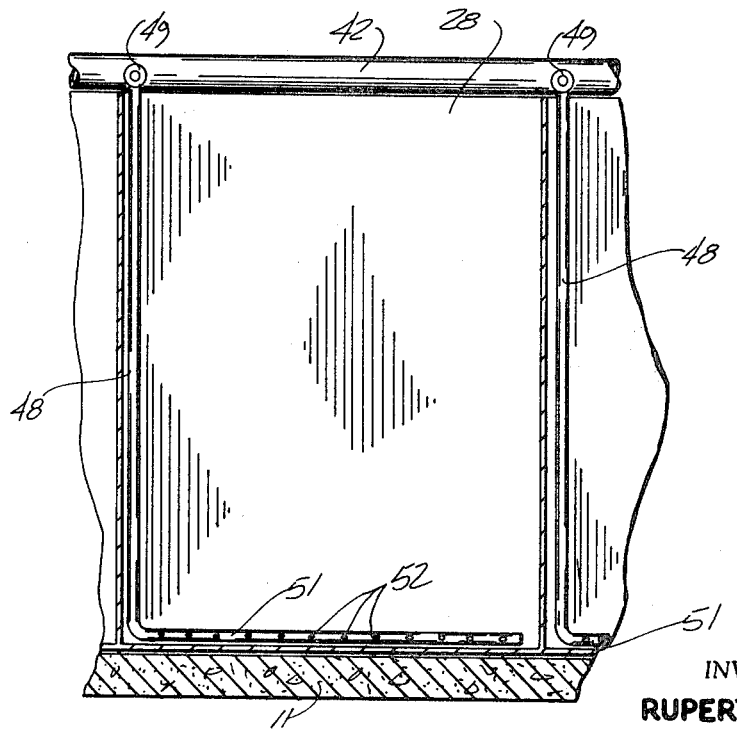
FIG. 3 is a partial sectional view as seen along lines 3—3 in FIG. 2.

Disposed along the central longitudinal wall 28 (FIG. 1) on the upper edge thereof, is a feed pipe 42, the feed pipe 42 having its one end 43 closed and having at its other end a fluidly connected right angle bifurcation 44 on each end of which is disposed an air pump 46 driven by an electric motor 47, both pumps and motors being secured to the top wall 45 of the digester tank 13. Spaced along the length of the feed pipe 42 are a plurality of downcomers 48 (FIG. 3), pipes fluidly connected to the feed pipe 42 and extending downwardly, one each, to the bottom of each of the tanks 13, 14, 16, 17, 18, 19 and 22. Each of the downcomers has secured at the top end thereof, a standard valve 49 for regulating the amount of air entering from the feed pipe 42, and at the lower end thereof a perforated longitudinally disposed pipe 51 extending normally therefrom along the central longitudinal wall 28 for the length of its respective tank. A plurality of perforations 52 formed in the pipe 51 provide vents for air to escape into the tanks.

The settling tank 21 (FIGS. 4 and 5) has a conduit 53 fluidly connected to its inlet hole 41 and projects downwardly so that its free end 54 is disposed near the lowest point of the floor surface 56, the floor surface 56 being hopper-shaped and slanting downwardly from both ends toward the middle as well as slanting downwardly toward the central longitudinal wall 28. Disposed near the end 54 is the free end 57 of another conduit 58 which projects upwardly, over the feed pipe 42, the central wall 28, and into the upper portion of aeration tank 13. A pump 59 is fluidly connected to the pipe 58 to pump sludge from the bottom of the tank 21 into the tank 13.

Disposed in the wall opposite the inlet hole 41 at substantially the same height is a discharge hole 61 passing through a transverse wall 62. Secured to wall 62 and extending across its length, is a V-shaped trough 63, having its vertex just below the hole 61 and rising shallowly toward each of the central longitudinal wall 28 and an outside wall 64. The cross-section of the trough 63 is L-shaped, projecting first normally out from wall 62 and then upwardly, the free edge 66 being corrugated with V-notches 67. Spaced outwardly and parallel to wall 62 is a scum board 68, a rectangular flat metal member extending the length of wall 62 and having its upper 69 and lower 71 edges higher and lower than the top and bottom of the trough, respectively. A horizontal post 72 secured to and extending normally out from wall 62 provides a support for the scum board 68.

A third conduit 73 (FIG. 4) is disposed in the settling tank 21, its free end 74 disposed in an open topped container 75 mounted in tank 21. The conduit 73 extending upwardly, over the transverse wall 62 across tank 22, and downwardly into the digester tank 12. Its free end 74 has disposed therein an electric submersible pump 76 controlled by a float switch 77 on the periphery of the conduit 73.

The container top edge is disposed in a horizontal plane extending through or just below the bottom of the inlet hole 41 and receives scum which floats on the surface of the liquid in the settling tank 21 and same liquid. As noted heretofore the agitation of the liquid in the aeration tanks 13 – 17 causes the scum to remain in solution, however in the unagitated settling tank it separates out of solution. At predetermined times the submersible pump 76 is activated by a conventional timer device (not shown) and the liquid and scum are pumped to the digester tank. Upon substantially eliminating the contents of the container the float deactivates the pump and the container refills at which time the float reactivates the pump. This cycling of the pump continues until the scum is substantially removed from the tank 21 or until the timer device stops the cycle.

The final aeration tank 22 has a sloping floor and aeration pipes 48 and 51 similar to the aeration tank 19 shown in FIG. 2. Its outer wall has disposed therein an effluent pipe 79 for the discharge of purified water. The transverse wall 62 has disposed thereon, around the hole 61, cylinder 81 (FIG. 6) projecting normally outward into final aeration tank 22. Intermediate the ends of the cylinder 81 is a cutaway portion 82 in the top portion of the cylinder 81, the cutaway portion acting as a stilling chamber for the liquid flowing through the cylinder 81. At the cylinder's free end 83 is a calibrated V-notched weir 84 for determining the volume of fluid flow through the cylinder 81.

The opening for the effluent pipe 79 is disposed below the bottom of the weir 84 thus permitting a difference in the level of the contents of tanks 21 and 22.

In operation, the raw sewage enters the digester tank 12 through influent pipe 23, where the larger solids remain to decompose. The liquid content enters the first aeration tank 13 where it is mixed with activated sludge being pumped from the settling tank 21 through conduit 58. The effluent in the tank 13 is aerated by the turbulent action of the air entering from the perforated pipe 51, circulation being aided by the sloping floor which also prevents building of sludge in the corners of the tank. Further aeration and aerobic decomposition is effected as the affluent passes on into aeration tanks 14 through 19, the amount of air being supplied decreasing in relationship to the degree of decomposition. The effluent, upon reaching the settling tank 21 comprises amounts of liquid, suspended sludge and scum, which separate in tank 21, which has no aeration means. The sludge which settles to the bottom is pumped back into the first aeration tank 13 through conduit 58, the liquid passes through hole 61 into a final aeration tank 22, and the floating scum, restricted by the scum board 68, is pumped into the digester tank 12, at predetermined times. The affluent in tank 22 is further aerated and possibly chlorinated before being discharged through the effluent pipe 79 as purified water.

I claim:

1. An activated sludge plant connected to an influent pipe, the activated sludge plant comprising:

a digester tank having an intake opening and an exhaust opening, said intake opening fluidly connected to the influent pipe;

a plurality of aerating tanks fluidly interconnected in series, each said aerating tank having an inlet opening and an outlet opening with said inlet opening of the first said aerating tank fluidly connected to said digester tank exhaust opening, said outlet opening of said first and intermediate aerating tanks fluidly connected respectively to the inlet opening of the next adjacent aerating tank;

a settling tank having an inlet hole and an outlet hole, said inlet hole fluidly interconnected to said last aerating tank outlet opening, said settling tank provided to permit scum and sludge to separate from the liquid with the scum floating to the top and the sludge settling to the bottom thereof;

an inlet conduit disposed in said settling tank and fluidly connected on one end to said inlet hole with the other end thereof disposed adjacent the bottom of said settling tank;

a scum board disposed in said settling tank proximate said outlet hole, said scum board operable to substantially prevent the scum from flowing through said outlet hole;

a final aeration tank having an inlet opening and an outlet opening formed thereon, said inlet opening fluidly connected to said outlet hole and said outlet opening operable to discharge effluent from said final aerating tank; and air supply means mounted in each said aerating tank and operable to emit air into each said aerating tank;

wherein fresh sewage flows into said digester tank, from said digester tank through said plurality of aeration tanks wherein it is aerated, from the last said aeration tank into said settling tank, from said settling tank into said final aeration tank where it is again aerated, and then out of said final aeration tank as substantially purified water effluent.

2. An activated sludge plant as defined in claim 1 including an open topped trough mounted on the wall of said settling tank between said scum board and said outlet hole wherein said trough is fluidly connected to said outlet hole and provides a passage in which the liquid in said settling tank flows to said outlet hole.

3. An activated sludge plant as defined in claim 1 including a sludge conduit having one end disposed in said settling tank adjacent the bottom thereof and the other end disposed in said first aerating tank, and a sludge pump fluidly connected to said sludge conduit and operable to pump sludge from said settling tank to said first aerating tank.

4. An activated sludge plant as defined in claim 1 including a scum conduit having one end disposed in the upper portion of said settling tank and the other end disposed in the upper portion of said digester tank, and a scum pump fluidly connected to said scum conduit and operable to pump the scum from said settling tank to said digester tank.

5. An activated sludge plant as defined in claim 4 including an open topped container mounted in said settling tank which is adapted to receive the scum which floats in said settling tank, said scum conduit one end disposed therein, and control means operably connected to said scum pump to activate said scum pump to pump the contents in said container to said digester tank.

6. An activated sludge plant as defined in claim 1 wherein said air supply means comprises an air pump; a feed line fluidly connected to said pump and extending adjacent said aerating tanks; downcomers extending from said feed line to the lower portion of each of said aerating tanks; perforated longitudinals fluidly connected to each of said downcomers and extending along one wall of each said aerating tanks; a valve disposed at the top of each downcomer and adaptable to regulate the amount of air being delivered to each longitudinal.

7. An activated sludge plant as defined in claim 6 wherein said valves are so regulated as to successively decrease the amount of air being delivered, respectively, in said successive aerating tanks.

8. An activated sludge plant as defined in claim 7 wherein the bottom wall of each said aerating tanks is sloped downwardly toward said longitudinals.

9. An activated sludge plant as defined in claim 1 wherein the bottom wall of said settling tank is hopper-shaped, sloping downwardly towards it center.

10 An activated sludge plant as defined in claim 7 including an open topped trough mounted on the wall of said settling tank between said scum board and said outlet hole wherein said trough is fluidly connected to said outlet hole and provides a passage in which the liquid in said settling tank flows to said outlet hole, said trough having a V-shaped bottom with the apex thereof disposed in adjacent the lower edge of said outlet hole and the upper edges of the trough bottom are disposed outwardly from said apex and above said outlet hole outer edge, and the upper outer edge of said trough is corrugated with V-notches.

11. An activated sludge plant as defined in claim 10 including a timer device operably connected to said scum pump wherein said pump will operate at predetermined times.

* * * * *